United States Patent
Kang et al.

(10) Patent No.: US 6,783,897 B2
(45) Date of Patent: Aug. 31, 2004

(54) CROSSLINKING AGENT AND CROSSLINKABLE SOLID POLYMER ELECTROLYTE USING THE SAME

(75) Inventors: Yongku Kang, Daejeon (KR); Changjin Lee, Daejeon (KR); Won Sil Lee, Daejeon (KR); Kun Ae Noh, Daejeon (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 0 days.

(21) Appl. No.: 10/282,214

(22) Filed: Oct. 28, 2002

(65) Prior Publication Data

US 2003/0134968 A1 Jul. 17, 2003

(30) Foreign Application Priority Data

Nov. 15, 2001 (KR) ........................................ 2001-70969

(51) Int. Cl.$^7$ ............................................. H01M 10/26
(52) U.S. Cl. ......................... 429/313; 522/99; 524/366; 524/401; 524/588; 528/24
(58) Field of Search ..................... 528/24, 32; 524/366, 524/404, 414, 418; 429/313

(56) References Cited

U.S. PATENT DOCUMENTS

| | | | |
|---|---|---|---|
| 4,673,718 A | 6/1987 | Ryntz et al. | ................ 525/476 |
| 4,766,185 A | 8/1988 | Ryntz et al. | ................ 525/479 |
| 4,830,939 A | 5/1989 | Lee et al. | ................ 429/192 |
| 4,906,718 A * | 3/1990 | Gornowicz et al. | ........... 528/15 |
| 5,009,970 A * | 4/1991 | Kronfli et al. | ............... 429/317 |
| 5,277,043 A | 1/1994 | Inashvili | ........................ 70/238 |
| 5,300,375 A * | 4/1994 | Chaloner-Gill | ............. 429/313 |
| 5,440,011 A | 8/1995 | Laine | .......................... 528/425 |
| 4,830,939 A | 10/1996 | Lee et al. | ................... 429/192 |
| 6,160,148 A * | 12/2000 | Dauth et al. | ................. 556/419 |
| 2002/0051911 A1 * | 5/2002 | Okada | ......................... 429/313 |

FOREIGN PATENT DOCUMENTS

JP    5290616    11/1993

OTHER PUBLICATIONS

Pantaloni, S. et al., Electrochemical Characterization of a Class of Low Temperature Conducting Polymer Electrolytes, *Electrochimica Acta*, 1989, vol. 34, No. 5, pp. 635–640.

Kono, M. et al., Network Polymer Electrolytes with Free Chain Ends as Internal Plasticizer, *J. Electrochem. Soc.*, vol. 145, No. 5, May 1998, pp. 1521–1527.

Abraham, K.M. et al., Highly Conductive PEO–like Polymer Electrolytes, *Chem. Mater.* 1997, 9, pp. 1978–1988.

Fish, D. et al., Conducitivity of Solid Complexes of Lithium Perchlorate Poly{[ω– methoxyhexa(oxyethylene) ethoxy] methylsiloxane , *Makromol Chem., Rapid Commun.*, vol. 7, pp. 115–120 (1986).

Blonsky, P. et al., Polyphosphazene Solid Electrolytes, *J. Am. Chem. Soc.* 1984, vol. 106, pp. 6854–6855.

KR Publication No. 1020010004121, Jan. 15, 2001, Korea (Application Abstract).

* cited by examiner

*Primary Examiner*—Margaret G. Moore
*Assistant Examiner*—Marc S Zimmer
(74) *Attorney, Agent, or Firm*—Jones Day (57) ABSTRACT

The present invention relates to a crosslinking agent comprising methyl siloxane polymer of a backbone having a polyalkylene oxide group as a branch group and acryl groups at both ends, and a crosslinkable solid polymer electrolyte composition comprising a crosslinking agent, a lithium salt, an organic solvent, and a curing initiator mixed in a certain ratio. The crosslinkable solid polymer electrolyte composition has a high ionic conductivity at room temperature and can be readily formed into a film and is thus suitable for use in large-size lithium-polymer secondary batteries applicable to electric cars, power storage devices for power leveling and the like, as well as in small-size lithium-polymer secondary batteries applicable to video cameras, portable data terminals such as cellular phones and notebook computers, and the like.

6 Claims, 1 Drawing Sheet

CROSSLINKING AGENT AND CROSSLINKABLE SOLID POLYMER ELECTROLYTE USING THE SAME

FIELD OF THE INVENTION

The present invention relates to a crosslinking agent and a crosslinkable solid polymer electrolyte using the same. More particularly, the present invention relates to a crosslinking agent comprising methyl siloxane polymer of a backbone having polyalkylene oxide groups as branch groups and acryl groups being crosslinkable by heat or light irradiation at both ends thereof, and a crosslinkable solid polymer electrolyte composition comprising the crosslinking agent, a lithium salt, an organic solvent, and a curing initiator mixed at an appropriate ratio. The crosslinkable solid polymer electrolyte composition has a high ionic conductivity at room temperature and can be readily formed into a film and is thus suitable for use in large-size lithium-polymer secondary batteries applicable to electric cars, power storage devices for load leveling and the like, as well as in small-size lithium-polymer secondary batteries applicable to video cameras, portable data terminals such as cellular phones and notebook computers, and the like.

BACKGROUND OF THE INVENTION

Electrochemical devices using solid electrolytes have been the subject of intense investigation and development due to the advantages that they can not only provide high charging/discharging efficiency, can be used in manufacturing various types of batteries, can be manufactured in film types thus being prepared in small-sized apparatuses but also they are leakage-free compared with electrochemical devices using liquid electrolytes. Especially, lithium-polymer batteries using polyalkylene oxide (PAO) based solid polymer electrolytes can be employed widely since they can provide batteries of high energy density.

The PAO based solid polymer electrolyte was discovered by P. V. Wright in 1975(*British Polymer Journal, vol.* 7, p. 319), and M. Armand named it "ion conducting polymer" in 1978. Since that time, its use in the electrochemical devices has gradually increased. The typical solid polymer electrolyte is composed of polymers having electron-donating atoms such as oxygen, nitrogen and phosphorus, together with a complex of a lithium salt. The most typical example consists of polyethylene oxide (PEO) and a complex of a lithium salt. This shows a low ion conductivity of about $10^{-8}$ S/cm at room temperature, and therefore, it cannot be applied to the electrochemical devices operated at room temperature. However, it can be used as a power source for electrochemical devices operated at a elevated temperature.

The ion conductivity of the solid polymer electrolyte usually increases as the segmental motion of the polymer chain increases. Therefore, the crystalline region within the polymer structure should be minimized to increase the amorphous region. In connection with this, Blonsky et al. reported on the application of poly(bis(methoxyethoxyethoxy)phosphazine) (*J. Am. Chem. Soc.*, 106, 6854(1984)). Pantaloni et al. reported on the applicability of poly(ethoxyethoxyethoxy)vinylether (*Electrochim. Acta*, 34, 635(1989)). Further, there is disclosed a method for forming an interpenetrating polymeric network containing polyalkylene glycol modified to include terminal unsaturated hydrocarbon groups, a liquid electrolyte and an electrolyte salt by exposure to ultraviolet or electron beam radiation (U.S. Pat. No. 4,830,939; *J. Electrochemm. Soc.*, 145, 1521(1998)). However, the branched or network solid polymer electrolytes showed an ion conductivity of about $10^{-5-10-4}$ S/cm at room temperature and poor mechanical properties when they were formed into films.

Accordingly, in order to solve these problems, a solid polymer electrolyte introducing low molecular weight polyethylene oxides to vinylidenfluoride-hexafluoropropene copolymers was disclosed to improve the ionic conductivity (*Chem. Mater.*, 9, 1978, (1997)). Another solid polymer electrolyte using a crosslinking agent having three ethylene glycol acrylates at the center of cyclic alkyl, hetero alkyl molecule was also introduced to reinforce mechanical properties (KR Pat. Publication No. 01-4121 and KR Pat. Appl. No. 01-12913).

Studies on polyalkylene oxide backbones of crosslinkable and branched solid polymer electrolytes have been intensified because of expectation that polysiloxane polymer having polyethylene oxide side chains may move sufficiently due to its own flexibility and a low glass transition temperature (*Macromol. Chem. Rapid Commun.*, 7(1986) 115, U.S. Pat. Nos. 4,673,718, 4,766,185, 5,227,043, and 5,440,011, Japanese Patent Laid-open No. 5-290616). However, these polysiloxane solid polymer electrolytes have poor mechanical properties and $10^{-4}$ S/cm of an ionic conductivity at room temperature, and are thus not suitable for use in lithium batteries.

SUMMARY OF THE INVENTION

Accordingly, an object of the present invention is to provide a crosslinking agent to be used for solid polymer electrolyte comprising methyl siloxane polymer having polyalkylene oxide groups as a branch group and 2 to 4 acryl groups at both ends thereof.

Another object of the present invention is to provide a crosslinkable solid polymer electrolyte comprising the above crosslinking agent, a lithium salt, a plasticizer, and a curing initiator.

The solid polymer electrolyte having the crosslinking agent of the present invention exhibits enhanced mechanical properties and electrochemical stabilities due to its three dimensional network structure and can be readily formed into a film with high ionic conductivity at room temperature by facilitating the introduction of a plasticizer such as a polyalkylene oxide having low molecular weight and an organic solvent which can improve the conductivity. Thus, the solid polymer-electrolyte of the present invention is advantageously applied to lithium-polymer secondary batteries due to excellent adhesive property to electrodes and chemical and electrochemical stabilities.

DETAILED DESCRIPTION OF THE INVENTION

The present invention provides a crosslinking agent to be used for solid polymer electrolytes which have alkylene oxides as a branch group and 2 to 4 acryl groups at both ends thereof and expressed by the formula (1), wherein $R_1$, $R_2$, and $R_3$ are independently a hydrogen atom or a methyl group;

$R_4$ is a single bond or

X is —O— or m and n are independently an integer of 0 to 1000; p and q are independently an integer of 0 to 20 and a minimum number of the sum of p and q is one; and r is an integer of 1 to 6.

The present invention further provides a solid polymer electrolyte composition comprising:

0.1 to 80 wt. % of the crosslinking agent of formula (1);
0.1 to 80 wt. % of a plasticizer selected at least one from the group consisting of polyalkylene glycol dialkyl ether of formula (2) and non-aqueous polar solvents;
3 to 30 wt. % of lithium salt; and
0.5 to 5 wt. % of a curing initiator, wherein $R_5$ and $R_6$ are independently a linear or branched alkyl group of $C_1$-$C_{10}$; $R_7$, $R_8$, and $R_9$ are independently a hydrogen atom or a methyl group; and p, q, and l are independently an integer of 0 to 20.

The present invention will be described in detail hereunder. According to the present invention, for improving the ionic conductivity of solid polymer electrolyte composition at room temperature, novel crosslinking agent is used to increase the compatibility between a plasticizer such as polyalkylene oxide having low molecular weight of formula (2) or a non-aqueous polar solvent and lithium salt. This electrolyte composition is coated and exposed to heat or light irradiation to form three dimensionally cross-linked polymer electrolyte thin films and further lithium-polymer secondary batteries.

In the solid polymer electrolyte composition of the present invention, the crosslinking agent of formula (1) is used, where the crosslinking agent has polymethyl siloxane polymer as a major backbone having branched group of alkylene oxides and 2 to 4 of acryl functional groups at the both ends thereof. The polymethyl siloxane polymer which is the major backbone of the crosslinking agent improves mechanical properties such as flexibility and the polyalkylene oxide group is introduced as branch groups to increase the compatibility with a plasticizer in order to improve the ionic conductivity. Further, the crosslinking agent has 2 to 4 arcyl functional groups at the both ends thereof to have the solid polymer electrolyte three dimensional network structure after the cross-linking process.

The crosslinking agent of formula (1) according to the present invention can be prepared by conventional methods. For example, as shown in Scheme 1a, the crosslinking agent of formula (1) is prepared by reacting tetramethyl cyclotetrasiloxane (DH4) of formula (3a) as a starting material to produce tetramethyl tetra(polyalkylene oxide) cyclotetrasiloxane (PEG-D4) of formula (4), and further reacting the result compound of formula (4) with a polymerization terminator represented by formula (5) in the presence of fuming sulfuric acid as a catalyst. As shown in Scheme 1b, the crosslinking agent of formula (1) is also prepared by reacting a mixture of octamethyl cyclotetrasiloxane (D4) of formula (3b), tetramethyl tetra(polyalkylene oxide) cyclotetrasiloxane (PEG-D4) of formula (4), and a polymerization terminator of formula (5) in the presence of fuming sulfuric acid as a catalyst.

wherein $R_1$, $R_2$, and $R_3$ are independently a hydrogen atom or a methyl group;

$R_4$ is a single bond or

X is —O— or m and n are independently an integer of 0 to 1000; p and q are independently an integer of 0 to 20 and a minimum number of the sum of p and q is one; and r is an integer of 1 to 6.

electrolyte composition, preferably from 5 to 60 wt. %, more preferably from 10 to 50 wt. %.

In the solid polymer electrolyte composition of the present invention, the plasticizer is used to improve the conductivity by favoring lithium salt dissociation and lithium ion conductivity. The plasticizer includes polyalkylene glycol dialkyl ether of formula (2) and at least one chosen from non-aqueous polar solvents and a mixture thereof. In general, the conductivity of solid polymer electrolytes is highly dependent on the amount of plasticizer. It is reported that the more the plasticizer is used, the higher the conductivity is. However, when the plasticizer is used too much, even though the conductivity is increased, the mechanical properties are considerably decreased so that it cannot form a film or battery. All the matters considered, the plasticizer in the solid polymer electrolyte composition of the present invention is used preferably in the range of from 0.1 to 70 wt. %, but it is possible to use maximum 80 wt. %. According to the present invention, when 70 wt. % of the wherein $R_1$, $R_2$, $R_3$, $R_4$, X, m, n, p, q, and r are the same as defined previously.

The crosslinking agent of formula (1) is used in the range of from 1 to 80 wt. % based upon the total weight of the plasticizer is used, it can provide the production of a film having less than 100 μm.

Examples of the plasticizer of formula (2) include polyalkylene glycol dialkyl ethers which are polyethylene glycol dimethyl ether, polyethylene glycol diethyl ether, polyethylene glycol dipropyl ether, polyethylene glycol dibutyl ether, polyethylene glycol diglycidyl ether, polypropylene glycol dimethyl ether, polypropylene glycol diglycidyl ether; polypropylene glycol/polyethylene glycol copolymer at the end portion of dibutyl ether; and polyethylene glycol/polypropylene glycol block copolymer at the end portion of dibutyl ether. Other examples of the plasticizer include non-aqueous polar solvents which are ethylene carbonate, propylene carbonate, butylenes carbonate, dimethyl carbonate, tetrahydrofuran, 2-methyltetrahydrofuran, 1,3-dioxiran, 4,4-dimethyl-1,3-dioxiran, γ-butyrolactone, and acetonitrile.

In the solid polymer electrolyte composition of the present invention, the lithium salt is used, where the lithium salt is not limited to the particular one. The conventional lithium salts are $LiClO_4$, $LiCF_3SO_3$, $LiBF_4$, $LiPF_6$, $LiAsF_6$, $Li(CF_3SO_2)_2N$, and the like. The lithium salt is present in the range of from 3 to 30 wt. %, preferably from 5 to 15 wt. %.

The solid polymer electrolyte composition of the present invention includes a curing initiator which can be either photoinitiator or thermalinitiator. Examples of the photoinitiator include ethyl benzoin ether, isopropyl benzoin ether, α-methyl benzoin ethylether, benzoin phenylether, α-acyloxime ester, α, α-diethoxyacetophenone, 1,1-dichloroacetophenone, 2-hydroxy-2-methyl-1-phenylpropan-1-one (Ciba Geigy Corp., Darocur 1173), 1-hydroxy cyclohexyl phenyl ketone (Ciba Geigy Corp., Irgacure 184, Darocur 1116, Irgacure 907), anthraquinone, 2-ethyl anthraquinone, 2-chloro anthraquinone, thioxanthone, isopropylthioxanthone, chlorothioxanthone, benzophenone, p-chlorobenzophenone, benzyl benzoate, benzoyl benzoate, Michler's ketone and the like. Examples of thermal initiator include azoisobutyronitriles, peroxides, and the like. The initiator is preferably used in an amount from 0.1 to 5.0 wt. % based upon the total weight of the electrolyte composition, depending on the needs of the polymer electrolyte. Particularly, the ratio of the amount of the initiator to the amount of the poly(alkylene glycol) oligomer or polymer should be proper.

A process for manufacturing a solid polymer electrolyte film including the inventive components is described hereinafter. First, the plasticizer and the lithium salt are charged into a reactor at an appropriate mixing ratio, and the mixture is stirred with a stirrer so as to prepare a solution. A crosslinking agent of the present invention is added to the solution, and then mixing is carried out. Next, a curing initiator is added into the mixture, and stirring is carried out to form a reaction mixture for manufacturing the solid polymer electrolyte of the present invention. This solution is then spread on a supporting substrate which is made of, for example, glass or polyethylene, or on a commercial Mylar film. Then the coated substrate is exposed to electron beams, ultraviolet lights or gamma rays, or heating is carried out, to achieve a curing reaction, thereby forming a film. Another alternative process for obtaining a film is as follows. The inventive solid polymer electrolyte solution is spread on a supporting substrate, and a spacer is fixed to each of the ends of the supporting substrate. Then another supporting member is overlapped on the former substrate. Next, a curing irradiator or a heat source is used to carry out a curing reaction, thereby manufacturing the solid polymer electrolyte film.

As described above, the solid polymer electrolyte of the present invention provides an enhanced flexibility due to the structural characteristics of the crosslinking agent itself and the mechanical properties thereof can be controlled with degree of cross-linking and the molecular weight of the crosslinking agent. Further, a polyethylene oxide side chain length can be controlled to increase the compatibility and improve ionic conductivity. The invention further provides a lithium-polymer secondary battery employing the solid polymer electrolyte with improved mechanical strength and ionic conductivity.

The following Examples are intended to further illustrate the present invention without limiting its scope.

PREPARATION EXAMPLE 1

Preparation of Tetramethyl Tetra(Polyalkylene Oxide) Cyclotetrasiloxane Monomer (Formula (4); PEG-D4)

Into 550 ml of THF dried over Na in 1000 ml of a three-necked flask equipped with a thermometer, a stirrer and a dropping funnel, were added 6 g of NaOH and 20.525 g of tri(ethylene glycol) monomethyl ether (TEGMe, $M_w$=164.2). After cupric chloride as a polymerization inhibitor was added under a nitrogen atmosphere, 18.15 g of allylbromide was added into the reaction mixture. The reaction mixture was heated at reflux for 12 hours. Remained NaOH and produced NaBr were filtered off and THF was evaporated under the reduced pressure. The residue was dissolved in chloroform or methylene chloride and extracted with 5 wt. % of aqueous NaOH solution three times. The organic layer was separated, dried over anhydrous $MgSO_4$, and evaporated under the reduced pressure to produce 18.33 g of tri(ethylene glycol) monomethyl monoallyl ether (TEGM164Ae, $M_w$=164.2, yield 71.8%).

$^1$H-NMR (300 MHz, $CDCl_3$): ppm 3.37(s, 3H), 3.54–3.67 (m, 12H), 4.02(d, 2H), 5.25(m, 2H), 5.90(m, 1H); $^{13}$C-NMR (300 MHz, $CDCl_3$): ppm 58.99, 69.41, 70.51, 70.61, 71.92, 72.18, 116.99, 134.78.

43.75 g of poly(ethylene glycol) monomethyl ether ($M_w$=350) and 18.15 g of allylbromide were reacted under the same condition described above to produce 36.80 g of poly(ethylene glycol) monomethyl monoallyl ether (PEGM350Ae, $M_w$=350, yield 75.4%).

$^1$H-NMR (300 MHz, $CDCl_3$): ppm 3.52(s, 3H), 3.66–3.86 (m, 28.8H), 4.14–4.18(d, 2H), 5.25–5.50(m, 1H), 5.95–6.15 (m, 2H); $^{13}$C-NMR (300 MHz, $CDCl_3$): ppm 59.31, 69.73, 70.81, 70.88, 72.23, 72.50, 117.32, 135.09

2,4,6,8-Tetramethyl cyclotetrasiloxane(DH4) (3 g, 0.0125 mol) was dissolved in 50 ml of toluene in a three-necked flask and further Pt(0)-1,3-divinyl-1,1,3,3-tetramethyl disiloxane complex(Pt(0)) catalyst was added thereto. To the reaction mixture, was added dropwise TEGM164Ae (11.21 g, 0.055 mol) dissolved in 50 ml of toluene. The reaction mixture was refluxed at 110° C. for 12 hours under a nitrogen atmosphere. After cooling to room temperature, active carbon was added to the reaction mixture and stirred. Further, the reaction mixture was filtered and the resulting filtrate was evaporated under the reduced pressure to produce 12.85 g of D4-TEGMP164(yield 97.4%).

$^1$H-NMR (300 MHz, $CDCl_3$): ppm 0.00(s, 3H), 0.40–0.45 (m, 2H), 1.49–1.59 (m,2H), 3.31–3.60(m, 17H) $^{13}$C-NMR (300 MHz, $CDCl_3$): ppm 0.00, 13.76, 23.74, 59.75, 70.71, 71.23, 71.32, 72.64, 74.66.

3 g of DH4 and 30.8 g of PEGM350AE were reacted under the same condition described above to produce 29.2 g of D4-PEGMP350(yield 89.0%).

$^1$H-NMR (300 MHz, $CDCl_3$): ppm 0.00(s, 3H), 0.39–0.43 (m, 2H), 1.50–1.62(m, 2H), 3.31–3.59(m, 33.8H) $^{13}$C-NMR (300 MHz, $CDCl_3$): ppm 0.00, 13.75, 23.73, 59.77, 70,70, 71.28, 72.65, 74.69.

Into 200 ml of THF dried over Na in 1000 ml of a three-necked flask, equipped with a thermometer, a stirrer and a dropping funnel, were added 16.4 g of tri(ethylene glycol) monomethyl ether (TEGMe, $M_w$=164.2) and 19.45 g of 1,1-carbodiimidazole. The reaction mixture was reacted under a nitrogen atmosphere at 40–50° C. for 5–6 hours. Remaining carbodiimidazole was filtered out and extracted with chloroform or methylene chloride and 5 wt. % of aqueous NaOH solution three times. The organic layer was separated, dried over anhydrous $MgSO_4$, and evaporated under the reduced pressure to produce 21.0 g of tri(ethylene glycol) monomethyl ether carbonylimidazole (TEGM164CI) (yield 81.4%).

$^1$H-NMR ($CDCl_3$): ppm 8.14(s, 1H), 7.44(s, 1H), 7.07(s, 1H), 3.66–3.86(m, 12H), 3.52(s, 3H)

35 g of poly(ethylene glycol) monomethyl ether ($M_w$=350) and 19.45 g of 1,1-carbodiimidazole were reacted under the same condition described above to produce 35.0 g of poly(ethylene glycol) monomethyl ether carbonylimidazole (PEGM350CI) (yield 78.6%).

$^1$H-NMR ($CDCl_3$) ppm 8.14(s, 1H), 7.44(s, 1H), 7.07(s, 1H), 3.66–3.86 (m, 28.8H), 3.52(s, 3H)

Into 150 ml of THF dried over Na in 1000 ml of a three-necked flask equipped with a thermometer, a stirrer and a dropping funnel, were added 16.4 g of TEGM164CI and 7.83 g of allyl alcohol. The reaction mixture was heated at reflux under a nitrogen atmosphere for 24 hours. After the reaction was completed, THF was evaporated under the reduced pressure. The residue was dissolved in chloroform or methylene chloride, followed by extraction via 5 wt. % of aqueous NaOH solution three times. The organic layer was separated, dried over anhydrous MgSO$_4$, and evaporated under the reduced pressure to 21.7 g of allyl carbonate-introduced TEGM164AC (yield 87.5%).

$^1$H-NMR (300 MHz, CDCl$_3$): ppm 5.99–5.89(m, 1H), 5.39–5.24(m, 2H), 4.63–4.6(d, 2H), 3.66–3.86(m, 12H), 3.52(s, 3H)

35 g PEGM350CI and 7.83 g of allyl alcohol were reacted under the same reaction condition described above to produce 29.2 g of PEGM350AC (yield 85.4%).

$^1$H-NMR (300 MHz, CDCl$_3$): ppm 5.99–5.89(m, 1H), 5.39–5.24(m, 2H), 4.63–4.61(d, 2H), 3.66–3.86(m, 28.8H), 3.52(s, 3H)

2,4,6,8-Tetramethyl cyclotetrasiloxane (DH4) (3 g, 0.0125 mol) was dissolved in 50 ml of toluene in a three-necked flask. Pt(0)-1,3-divinyl-1,1,3,3-tetramethyl disiloxane complex (Pt(0)) was added and TEGM164AC (13.6 g, 0.055 mol) dissolved in 50 ml of toluene was added dropwise into the reaction mixture. The reaction mixture was refluxed under a nitrogen atmosphere at 110° C. for 12 hours, and then cooled to room temperature. Active carbon was added and the reaction mixture was stirred and filtered. The resulting filtrate was evaporated under the reduced pressure to produce 15.2 g of D4-TEGMPC164(yield 96.2%).

$^1$H-NMR (300 MHz, CDCl$_3$): ppm 0.00(s, 3H), 0.40–0.45 (m, 2H), 1.49–1.59(m, 2H), 3.31–3.60(m, 17H)

3 g of DH4 and 30.8 g of PEGM350AC were reacted under the same reaction condition of Example 3 to produce 23.6 g of D4-PEGMPC350(yield 92.0%).

$^1$H-NMR (300 MHz, CDCl$_3$): ppm 0.00(s, 3H), 0.39–0.43 (m, 2H), 1.50–1.62(m, 2H), 3.31–3.59(m, 33.8H)

PREPARATION EXAMPLE 2

Preparation of Acryl-Substituted Polymerization Terminating Agent (Formula 5)

(1) Preparation of D2-1,3-di(propylacrylate) (DAD2)

After 1,1,3,3-tetramethyl disiloxane (D2) (3 g, 0.0223 mol) was dissolved in 50 ml of toluene, Pt(0) catalyst was added and allyl alcohol (3.14 g, 0.0536 mol) dissolved in 50 ml of toluene was further added dropwise. The reaction mixture was reacted under a nitrogen atmosphere at 110° C. for 12 hours. After adding active carbon, the reaction mixture was stirred, filtered and evaporated under the reduced pressure to produce 2.90 g of D2-1,3-di(propanol) (yield 96.4%).

$^1$H-NMR (300 MHz, CDCl$_3$): ppm 0.03–0.05(m, 12H), 0.43–0.48(m, 4H), 1.49–1.64(m, 4H), 2.28(m, 2H), 3.45–3.53(m, 4H) $^{13}$C-NMR (300 MHz, CDCl$_3$): ppm 0.00, 13.73, 26.25, 73.12

D2-1,3-di(propanol) (6 g, 0.024 mol) and triethylamine (4.85 g, 0.048 mol) were dissolved in 100 ml of THF in a three-necked flask. The reaction mixture was stirred at 0° C. and acryloyl chloride (4.336 g, 0.048 mol) dissolved in 100 ml of THF was added dropwise thereto. After the reaction mixture was reacted for 2 hours, precipitates were filtered out. The resulting filtrate was evaporated under the reduced pressure and the yellow viscous liquid was dissolved in chloroform and extracted with water several times. The organic layer was separated, dried over anhydrous MgSO$_4$ and evaporated to produce 5.42 g of D2-1,3-di (propylacrylate) (DAD2) (yield 58.4%).

$^1$H-NMR (300 MHz, CDCl$_3$): ppm 0.00–0.04(m, 12H), 0.44–0.50(m, 4H), 1.58–1.63(m, 4H), 4.02–4.06(m, 4H), 5.73–5.77(d, 2H), 6.01–6.10(q, 2H), 6.30–6.37(d,2H) $^{13}$C-NMR (300 MHz, CDCl$_3$): ppm 0.00, 13.8, 22.4, 66.7, 128.4, 130.2, 166.0

(2) Preparation of D2-1,3-di(propoxy-6,7-propane diacrylate) (TAD2)

-continued

D₂-1,3-di(propoxy-6,7-propanediol)

D₂-1,3-di(propoxy-6,7-propanediacrylate) (TAD2)

7.08 g of 3-allyloxy-1,2-propane diol instead of propane diol was reacted with 1,1,3,3-tetramethyl disiloxane(D2) (3 g, 0.0223 mol) under the same reaction condition described above to produce 8.43 g of D2-1,3-di(propoxy-6,7-propane diol) (yield 94.8%).

$^1$H-NMR (300 MHz, CDCl$_3$): ppm 0.00–0.05(m, 12H), 0.41–0.46(m, 4H), 1.52–1.58(m, 4H), 2.11(s, 2H), 2.96(s, 2H), 3.35–3.81(m, 14H) $^{13}$C-NMR (300 MHz, CDCl$_3$): ppm 0.00, 13.83, 23.03, 63.81, 70.42, 71.93, 73.99.

20 g of D2-1,3-di(propoxy-6,7-propane diol) and 18.16 g of acryloyl chloride were reacted under the same reaction condition described above to produce 16.36 g of D2-1,3-di (propoxy-6,7-propane diacrylate) (TAD2) (yield 53.2%).

$^1$H-NMR (300 MHz, CDCl$_3$): ppm 0.00–0.04(m, 12H), 0.41–0.46(m, 4H), 1.49–1.54(m, 4H), 3.37–3.58(m, 8H), 4.30–4.39(m, 4H), 5.19–5.23(m, 2H), 5.78–5.84(m, 4H), 6.09–6.15(m, 4H), 6.33–6.39(m, 4H) $^{13}$C-NMR (300 MHz, CDCl$_3$): ppm 0.0, 13.9, 23.1, 62.8, 68.5, 70.2, 74.1, 127.7, 127.9, 131.0, 131.2, 165.1, 165.5

EXAMPLE 1

Preparation of Polyethylene Oxide-Substituted Polysiloxane Crosslinking Agent (Formula 1)

D4-TEGMP164(5 g, 0.00473 mol) and DAD2(1.46 g, 0.00378 mol) were charged into a three-necked flask and fuming sulfuric acid (0.014 ml) was added dropwise thereto and reacted at 30–35° C. for 6 hours. And the distilled water (0.03 ml) was added and reacted for 1 hour. 1.4 ml of chloroform and $Na_2SO_4$ saturated aqueous solution were added to the reaction mixture and then washed with 5 wt. % of $Na_2CO_3$ aqueous solution to neutralize. Anhydrous $MgSO_4$ and active carbon were added to the neutralized reaction mixture and stirred for 12 hours and then filtered. The resulting filtrate was evaporated under the reduced pressure to produce 3.2 g of TA-05(yield 45.9%).

$^1$H-NMR (300 MHz, $CDCl_3$): ppm 0.00–0.04(m, 27H), 0.40–0.45(m, 14H), 1.51–154(m, 14H), 3.31–3.60(m, 85H), 4.05(t, 4H), 5.77(d, 2H), 6.08(q, 2H), 6.38(d, 2H) $^{13}$C-NMR(300 MHz, $CDCl_3$): 0.00, 13.7, 24.8, 60.1, 67.5, 71.8, 72.1, 72.5, 73.4, 74.9, 129.7, 131.8

D4-PEGMP350(5 g, 0.00305 mol) and D2-1,3-di(propoxy-6,7-propane-diacrylate) (TAD2; 0.75 g, 0.00122 mol) were charged into a three-necked flask and fuming sulfuric acid (0.014 ml) was then added dropwise thereto and reacted at 30–35° C. for 6 hours. And the distilled water (0.03 ml) was added and reacted for 1 hour. 1.4 ml of chloroform and $Na_2SO_4$ saturated aqueous solution were added to the reaction mixture and then washed with 5 wt. % of $Na_2CO_3$ aqueous solution to neutralize. Anhydrous $MgSO_4$ and active carbon were added to the neutralized reaction mixture and stirred for 12 hours and then filtered. The resulting filtrate was evaporated under the reduced pressure to produce 2.73 g of PP-10, a crosslinking agent (yield 41.8%).

$^1$H-NMR (300 MHz, $CDCl_3$): ppm 0.00(m, 42H), 0.32–0.58(m, 24H), 1.41–1.68(m, 24H), 3.31–3.59(m, 342H), 3.94–4.43(m, 8H), 5.24–5.29(m, 2H), 5.79–5.82(m, 2H), 6.01–6.12(m, 4H), 6.37–6.48(m, 4H) $^{13}$C-NMR (300 MHz, $CDCl_3$): ppm 0.00, 13.9, 23.1, 59.8, 62.8, 68.5, 70.2. 70.7. 71.2, 71.3, 72.6 74.1, 127.7, 127.9, 131.0, 131.2, 165.1, 165.5

A PEG-D4 monomer (D4-TEGMP164, D4-PEGMP350, D4-TEGMPC164 or D4-PEGMPC350) of formula (4) and a polymerization terminating agent (DAD2 of TAD2) of formula (5) were polymerized in a molar ratio listed in Table 1 by the above procedure of Example 1 to produce poly(siloxane-g-ethylene oxide) acrylate crosslinking agent of formula (1). A molecular weight of the prepared polysiloxane copolymer cross-liker was identified by NMR end group analysis.

TABLE 1

| Reactants | | | | | | |
|---|---|---|---|---|---|---|
| Polymerization | PEG-D4 | | Crosslinking agent | | | |
| terminating agent (formula 5) | monomer (formula 4) | Mole ratio | Length of PEG branch group | Expected polymerization | Determined polymerization | Abbreviation |
| DAD2 | D4-TEGMP 164 | 4:5 | 3 | 5 | 5.5 | TA-05 |
|  |  | 2:5 | 3 | 10 | 9.7 | TA-10 |
|  |  | 1:5 | 3 | 20 | 21.0 | TA-20 |
|  | D4-PEGMP 350 | 4:5 | 7.2 | 5 | 4.7 | PA-05 |
|  |  | 2:5 | 7.2 | 10 | 9.9 | PA-10 |
|  |  | 1:5 | 7.2 | 20 | 24.5 | PA-20 |
| TaD2 | D4-PEGMP 164 | 4:5 | 3 | 5 | 5.8 | TP-05 |
|  |  | 2:5 | 3 | 10 | 8.5 | TP-10 |
|  |  | 1:5 | 3 | 20 | 23.9 | TP-20 |
|  | D4-PEGMP 350 | 4:5 | 7.2 | 5 | 5.3 | PP-05 |
|  |  | 2:5 | 7.2 | 10 | 10.5 | PP-10 |
|  | D4-PEGMPC 350 | 4:5 | 7.2 | 5 | 5.4 | PPC-05 |
|  |  | 2:5 | 7.2 | 10 | 11.2 | PPC-10 |

EXAMPLE 2

Preparation of Polyethylene Oxide-Substituted Polysiloxane Compolymer Crosslinking Agent (Formula 1)

D4-TEGMP164(5 g, 0.00473 mol), octamethyl cyclotetrasiloxane (D4; 1.4 g, 0.00472 mol), and D2-1,3-di(propylacrylate) (1.46 g, 0.00378 mol) were charged into a three-necked flask and fuming sulfuric acid (0.014 ml) was added dropwise thereto and reacted at 30–35° C. for 6 hours. And the distilled water (0.03 ml) was added and reacted for 1 hour. 1.4 ml of chloroform and $Na_2SO_4$ saturated aqueous solution were added to the reaction mixture and then washed with 5 wt. % of $Na_2CO_3$ aqueous solution to neutralize the same. Anhydrous $MgSO_4$ and active carbon were added to the neutralized reaction mixture and stirred for 12 hours and then filtered. The resulting filtrate was evaporated under the reduced pressure to produce 4.5 g of CTA-0505(yield 57.3%).

$^1$H-NMR (300 MHz, $CDCl_3$): ppm 0.00–0.04(m, 57H), 0.40–0.45(m, 14H), 1.51–1.54(m, 14H), 3.31–3.60(m, 85H), 4.05(t, 4H), 5.77(d, 2H), 6.08(q, 2H), 6.38(d, 2H) $^{13}$C-NMR (300 MHz, $CDCl_3$): 0.00, 13.7, 24.8, 60.1, 67.5, 71.8, 72.1, 72.5, 73.4, 74.9, 129.7, 131.8

D4-PEGMP350(5 g, 0.00305 mol), D4(0.905 g, 0.00305 mol), and D2-1,3-di(propoxy-6,7-propane-diacrylate) (0.75 g, 0.00122 mol) were charged into a three-necked flask and fuming sulfuric acid (0.014 ml) was then added dropwise thereto and reacted at 30–35° C. for 6 hours. And the distilled water (0.03 ml) was added and reacted for 1 hour. 1.4 ml of chloroform and $Na_2SO_4$ saturated aqueous solution were added to the reaction mixture and then washed with 5 wt. % of $Na_2CO_3$ aqueous solution to neutralize. Anhydrous $MgSO_4$ and active carbon were added to the neutralized reaction mixture and stirred for 12 hours and then filtered. The resulting filtrate was evaporated under the reduced pressure to produce 4.5 g of CPP-1010(yield 67.6%).

$^1$H-NMR (300 MHz, $CDCl_3$): ppm 0.00(m, 102H), 0.32–0.58(m, 24H), 1.41–1.68(m, 24H), 3.31–3.59(m, 342H), 3.94–4.43(m, 8H), 5.24–5.29(m, 2H), 5.79–5.82(m, 4H) 6.01–6.12(m, 4H), 6.37–6.48(m, 4H) $^{13}$C-NMR (300 MHz, $CDCl_3$): ppm 0.00, 13.9, 23.1, 59.8, 62.8, 68.5, 70.2. 70.7. 71.2, 71.3, 72.6 74.1, 127.7, 127.9, 131.0, 131.2, 165.1, 165.5

A D4 of formula (3a), PEG-D4 monomer (D4-TEGMP164, D4-PEGMP350, D4-TEGMPC164 or D4-PEGMPC350) of formula (4) and a polymerization terminating agent (DAD2 of TAD2) of formula (5) were polymerized in a molar ratio listed in Table 2 by the above procedure of Example 2 to produce polysiloxane copolymer crosslinking agent of formula (1). A molecular weight of the prepared polysiloxane copolymer cross-liker was identified by NMR end group analysis.

EXPERIMENTAL EXAMPLE 1

Ionic Conductivity (Preparation of a Conductive Thin Film)

The crosslinking agent TP-05(1 g) prepared in Example 1, poly(ethylene glycol) dimethyl ether (Mw=250, "PEGDMe 250", 1 g), and dimethylphenyl acetophenone (DMPA, 0.058 g) were mixed. Lithium trifluoromethane sulfonate ($CF_3SO_3Li$, 0.21 g) was added to the reaction mixture. Then the mixture solution was spread on a conductive glass substrate, and the substrate was exposed to ultraviolet light of a wavelength of 350 nm for 30 minutes under a nitrogen atmosphere. In this manner, a highly adhesive solid polymer electrolyte was manufactured.

(Experiment on Ionic Conductivity)

The ion conductivity was measured in the following manner. The reaction mixture was spread on a conductive glass patterned as a band type or on a lithium-copper foil, and was polymerized by carrying out a radiation curing. After the cured mixture was dried, the AC impedance was measured across band-type or sandwich-type electrodes, and the measured value was analyzed by a frequency analyzer and the complex impedance was interpreted. The band-type electrodes were such that masking tapes with a width of 0.5–2 mm were attached at gaps of 0.5–2 mm on the conductive glass substrate. Then they were put into an etching solution to etch them, and then, a wash and a drying were carried out.

(1) Experiment on Ionic Conductivity with Varied Plasticizers

Ionic conductivities of the solid polymer electrolyte thin films prepared with solid polymer electrolyte compositions as listed in Table 3 were measured at room temperature by the above procedure of above experiment on ionic conductivity. The result is summarized in Table 3.

TABLE 3

| TP-05 | PEGDMe 250 | $LiCF_3SO_3$ | DMPA | $\alpha \times 10^{-4}$(S/cm) |
|---|---|---|---|---|
| 1 g | 0.000 g | 0.063 g | 0.029 g | 0.17 |
| 1 g | 0.177 g | 0.092 g | 0.035 g | 0.33 |
| 1 g | 0.429 g | 0.125 g | 0.042 g | 0.94 |
| 1 g | 1.000 g | 0.208 g | 0.058 g | 2.24 |
| 1 g | 2.330 g | 0.400 g | 0.097 g | 5.28 |

Ionic conductivities of the solid polymer electrolyte thin films prepared with varied solid polymer electrolyte compositions were measured by the procedure of above experiment on ionic conductivity, wherein an electrolyte solution prepared by dissolving ethylenecarbonate (EC) and propy-

TABLE 2

| | Reactants | | | Length of | Crosslinking agent | | | | |
|---|---|---|---|---|---|---|---|---|---|
| | | | | | Expected | | Determined | | |
| Terminating agent | PEG-D4 monomer | D4 (formula | Mole | PEG branch | poly-merization | | poly-merization | | |
| (formula 5) | (formula 4) | 3b) | ratio | group | (p) | (q) | (p) | (q) | Abbreviation |
| DAD2 | D4-TEGM 164Ae | | 4:5:5 | 3 | 5 | 5 | 5.7 | 5.5 | CTA-0505 |
| | | | 2:5:5 | 3 | 10 | 10 | 10.7 | 10.9 | CTA-1010 |
| | D4-PEGM 350Ae | | 4:5:5 | 7.2 | 5 | 5 | 5.3 | 5.2 | CPA-0505 |
| | | | 2:5:5 | 7.2 | 10 | 10 | 9.7 | 9.3 | CPA-1020 |
| TAD2 | D4-PEGM 164Ae | | 4:5:5 | 3 | 5 | 5 | 5.2 | 5.7 | CTP-0505 |
| | | | 2:5:5 | 3 | 10 | 10 | 9.2 | 9.7 | CTP-1010 |
| | D4-PEGM 350Ae | | 4:5:5 | 7.2 | 5 | 5 | 5.1 | 5.5 | CPP-0505 |
| | | | 2:5:5 | 7.2 | 10 | 10 | 10.5 | 11.1 | CPP-1010 | lenecarbonate (PC) mixed in 1 to 1 ratio in 1 M $LiPF_6$ was used instead of PEGDMe as a plasticizer. The result is summarized in Table 4.

TABLE 4

| PP-05 | 1 M $LiPF_6$ in EC/PC (1:1) | DMPA | $\alpha \times 10^{-4}$(S/cm) |
|---|---|---|---|
| 1 g | 2.33 g | 0.029 g | 29.8 |
| 1 g | 1.00 g | 0.029 g | 11.3 |
| 1 g | 0.40 g | 0.029 g | 6.7 |

(2) Experiment on Ionic Conductivity with Varied Plasticizers

Ionic conductivities of the solid polymer electrolyte thin films prepared with varied solid polymer electrolyte compositions were measured by the procedure of above experiment on ionic conductivity, wherein TP-10 and PP-10 were used instead of TP-05. The results are summarized in Tables 5(TP-10) and 6(PP-10).

TABLE 5

| TP-10 | PEGDMe 250 | $LiCF_3SO_3$ | DMPA | $\alpha \times 10^{-4}$(S/cm) |
|---|---|---|---|---|
| 1 g | 0.000 g | 0.074 | 0.029 g | 0.08 |
| 1 g | 0.177 g | 0.103 | 0.035 g | 0.31 |
| 1 g | 0.429 g | 0.136 | 0.042 g | 0.73 |
| 1 g | 1.000 g | 0.219 | 0.058 g | 2.29 |
| 1 g | 2.330 g | 0.411 | 0.097 g | 6.98 |

TABLE 6

| PP-10 | PEGDMe 250 | $LiCF_3SO_3$ | DMPA | $\alpha \times 10^{-4}$(S/cm) |
|---|---|---|---|---|
| 1 g | 0.000 g | 0.110 | 0.029 g | 0.33 |
| 1 g | 0.177 g | 0.135 | 0.035 g | 0.80 |
| 1 g | 0.429 g | 0.172 | 0.042 g | 1.43 |
| 1 g | 1.000 g | 0.254 | 0.058 g | 2.43 |
| 1 g | 2.330 g | 0.447 | 0.097 g | 4.35 |

Ionic conductivities of the solid polymer electrolyte thin films prepared with varied solid polymer electrolyte compositions were measured by the procedure of above experiment on ionic conductivity, wherein an amount of PEDMe was fixed at 50% by weight ratio and a plasticizer was varied. The result is summarized in Table 7.

TABLE 7

| Plasticizer | Amount of plasticizer | PEGDMe250 | $LiCF_3SO_3$ | DMPA | $\alpha \times 10^{-4}$ (S/cm) |
|---|---|---|---|---|---|
| TA-05 | 1 g | 1 g | 0.215 g | 0.058 g | 2.98 |
| TA-10 | 1 g | 1 g | 0.222 g | 0.058 g | 3.20 |
| PA-05 | 1 g | 1 g | 0.250 g | 0.058 g | 3.63 |
| PA-10 | 1 g | 1 g | 0.259 g | 0.058 g | 3.41 |
| TP-05 | 1 g | 1 g | 0.208 g | 0.058 g | 2.24 |
| PP-05 | 1 g | 1 g | 0.242 g | 0.058 g | 2.70 |
| PPC-05 | 1 g | 1 g | 0.208 g | 0.058 g | 3.75 |
| PPC-10 | 1 g | 1 g | 0.242 g | 0.058 g | 3.95 |
| CTA-0505 | 1 g | 1 g | 0.250 g | 0.058 g | 2.90 |
| CPA-1010 | 1 g | 1 g | 0.259 g | 0.058 g | 3.11 |
| CTP-0505 | 1 g | 1 g | 0.208 g | 0.058 g | 3.25 |
| CTP-1010 | 1 g | 1 g | 0.242 g | 0.058 g | 3.20 |

Figure 1:
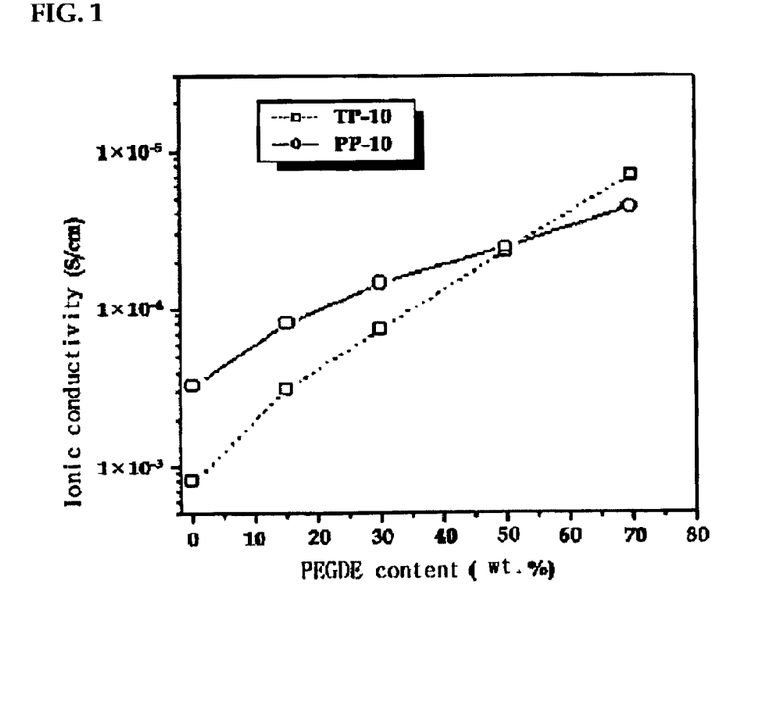
FIG. 1 is a graph showing the ionic conductivity of the solid polymer electrolyte composition of the present invention.

Further, when a crosslinking agent was TP-10 or PP-10, changes in ionic conductivity with varied amount of a plasticizer is illustrated in FIG. 1.

EXPERIMENTAL EXAMPLE 2

Electrochemical Property

Figure 2:
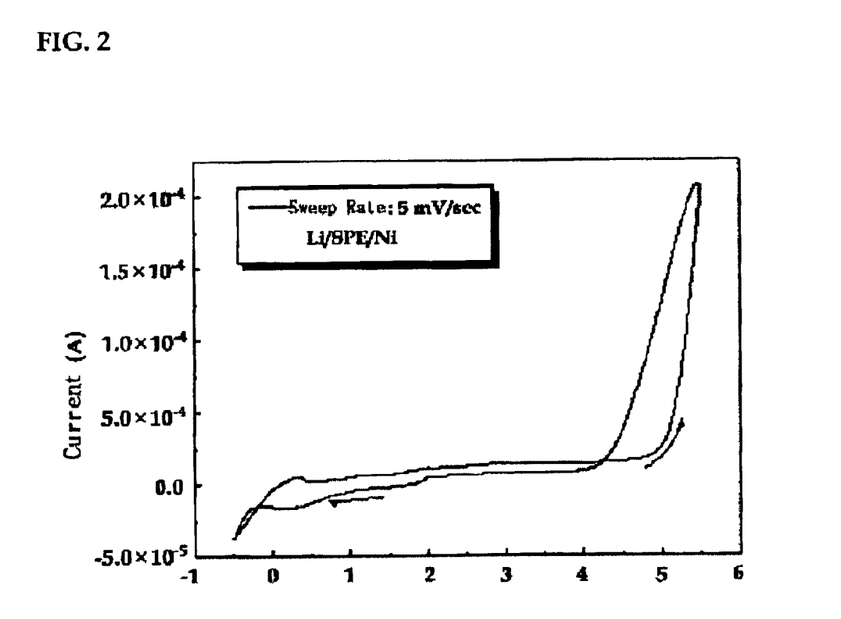
FIG. 2 is a graph showing the electrochemical stability of the solid polymer electrolyte composition of the present invention determined by cyclic voltammetry.

First, the solid polymer electrolyte thin film was prepared by using TA-05 as a crosslinking agent and 50 wt. % of PEGDMe as the same procedure of Example 1 on a nickel electrode cut into 1 cm×1 cm. The film thus prepared was sandwiched between lithium metals, and then it was vacuum-sealed, thereby completing a cell for measuring the electrochemical stability. The electrochemical stability was measured by linear sweep voltammetry at a sweep rate of 5 mV/sec from −0.3 to 5.5 V. The measured cyclicvoltammogram is illustrated in FIG. 2. The cyclicvoltammogram showed that reversible oxidation/reduction of lithium was observed at the rate of from −0.5 to 0.2 V and a decomposition of electrolyte occurred at above 4.95 V. Therefore, it could be confirmed that the solid polymer electrolyte of the present invention has a sufficient electrochemical stability for it to be suitable for use in a lithium-polymer secondary battery.

According to the present invention as described above, the solid polymer electrolyte composition using the inventive crosslinking agent forms a solid polymer electrolyte thin film with improved mechanical properties and with improved ion conductivity at room temperature. Further, this thin film of the present invention has excellent adhesive property to electrodes and electrochemical stabilities, so that it is suitable for use in large-size lithium-polymer secondary batteries applicable to electric cars, power storage devices for power leveling and the like, as well as in small-size lithium-polymer secondary batteries applicable to video cameras, portable data terminals such as cellular phones and notebook computers, and the like.

What is claimed is:

1. A crosslinking agent comprising a compound having a polymethyl siloxane backbone containing alkylene oxide branches and 2 to 4 acryl functional groups at both ends thereof of formula (1), wherein $R_1$, $R_2$, and $R_3$ are independently a hydrogen atom or a methyl group;

$R_4$ is a single bond or

X is —O— or m and n are independently an integer of 0 to 1000; p and q are independently an integer of 0 to 20 and a minimum number of the sum of p and q is one; and r is an integer of 1 to 6.

2. A solid polymer electrolyte composition comprising:

0.1 to 80 wt. % of the crosslinking agent of formula (1);

0.1 to 80 wt. % of a plasticizer selected at least one from the group consisting of polyalkylene glycol dialkyl ethers of formula (2) and non-aqueous polar solvents;

3 to 30 wt. % of a lithium salt; and

0.5 to 5 wt. % of a curing initiator,

(1)

wherein $R_1$, $R_2$, and $R_3$ are independently a hydrogen atom or a methyl group;

$R_4$ is a single bond or

X is —O— or m and n are independently an integer of 0 to 1000; p and q are independently an integer of 0 to 20 and a minimum number of the sum of p and q is one; and r is an integer of 1 to 6.

(2)

wherein $R_5$ and $R_6$ are independently a linear or branched alkyl group of $C_1$–$C_{10}$; $R_7$, $R_8$, and $R_9$ are independently a hydrogen atom or a methyl group; and p, q, and l are independently an integer of 0 to 20.

3. The solid polymer electrolyte composition of claim 2, wherein said lithium salt is selected from the group consisting of $LiClO_4$, $LiCF_3SO_3$, $LiBF_4$, $LiPF_6$, $LiAsF_6$ and $Li(CF_3SO_2)_2N$.

4. A solid polymer electrolyte thin film manufactured by using the solid polymer electrolyte composition of claim 2.

5. A lithium-polymer secondary battery manufactured by using the solid polymer electrolyte composition of claim 2.

6. The crosslinking agent of claim 1 wherein the sum of p and q is 3.

* * * * *